United States Patent
Viviano et al.

(10) Patent No.: US 9,009,068 B2
(45) Date of Patent: Apr. 14, 2015

(54) METHOD AND SYSTEM FOR PROVIDING LAUNDRY SERVICES

(75) Inventors: Michael J. Viviano, Centereach, NY (US); C. Michael Viviano, Mount Sinai, NY (US)

(73) Assignee: Laundry Station Services LLC, Mount Sinai, NY (US)

( * ) Notice: Subject to any disclaimer, the term of this patent is extended or adjusted under 35 U.S.C. 154(b) by 474 days.

(21) Appl. No.: 12/958,067

(22) Filed: Dec. 1, 2010

(65) Prior Publication Data
US 2012/0143708 A1    Jun. 7, 2012

(51) Int. Cl.
| | |
|---|---|
| *G06Q 20/00* | (2012.01) |
| *G06Q 20/20* | (2012.01) |
| *G06Q 20/18* | (2012.01) |
| *G06Q 30/06* | (2012.01) |
| *G07F 17/20* | (2006.01) |
| *G07F 17/12* | (2006.01) |
| *G07F 11/62* | (2006.01) |
| *G06G 1/14* | (2006.01) |
| *G06Q 10/00* | (2012.01) |
| *G07B 17/00* | (2006.01) |
| *G07F 19/00* | (2006.01) |

(52) U.S. Cl.
CPC ............ *G06Q 20/20* (2013.01); *G06Q 20/18* (2013.01); *G06Q 20/209* (2013.01); *G06Q 30/06* (2013.01); *G07F 17/20* (2013.01); *G07F 17/12* (2013.01); *G07F 11/62* (2013.01)

(58) Field of Classification Search
USPC .................................. 705/16–18, 22, 28, 30
See application file for complete search history.

(56) References Cited

U.S. PATENT DOCUMENTS

| | | |
|---|---|---|
| 2,800,988 A | 7/1957 | Timms |
| 2,805,747 A | 9/1957 | Maurer |
| 2,840,215 A | 6/1958 | Hensley, Jr. |
| 3,050,169 A | 6/1958 | Stackhouse |
| 3,076,538 A | 2/1963 | Hensley |
| 3,128,866 A | 4/1964 | Ratowsky |
| 4,348,967 A | 9/1982 | Schattner et al. |

(Continued)

FOREIGN PATENT DOCUMENTS

| | | | |
|---|---|---|---|
| GB | 2269469 | 2/1994 | |
| GB | 2269469 | * 9/1994 | ............... G07C 9/00 |

(Continued)

OTHER PUBLICATIONS

Sycamore System Publication (American Drycleaner, 71, 4, 35 (28), Jul. 2004).*

(Continued)

*Primary Examiner* — Ig T An
(74) *Attorney, Agent, or Firm* — B. Aaron Schulman, Esq.; Stites & Harbison, PLLC.

(57) ABSTRACT

A method and system for providing laundry services makes use of a laundry station having an interactive point-of-sale device operably connected to one or more laundry unit containers for housing items to be laundered. The laundry station is used: to receive and accept orders for laundry services from a customer, including the collection of payment from the customer; to provide information directing the customer to place their laundry in a designated laundry unit container in response to the order received from the customer; to generate and communicate an electronic message to instruct a laundry station operator or laundry services provider to fulfill the order.

10 Claims, 14 Drawing Sheets

(56) References Cited

U.S. PATENT DOCUMENTS

| | | | |
|---|---|---|---|
| 4,803,348 A | 2/1989 | Lohrey et al. | |
| 5,223,829 A | 6/1993 | Watabe | |
| 5,774,053 A | 6/1998 | Porter | |
| 5,962,834 A | 10/1999 | Markman | |
| 6,010,239 A * | 1/2000 | Hardgrave et al. | 700/213 |
| 6,300,873 B1 | 10/2001 | Kucharczyk et al. | |
| 6,344,796 B1 | 2/2002 | Ogilvie et al. | |
| 6,377,296 B1 | 4/2002 | Zlatsin et al. | |
| 6,470,303 B2 | 10/2002 | Kidd et al. | |
| 6,791,450 B2 | 9/2004 | Gokcebay et al. | |
| 6,882,269 B2 | 4/2005 | Moreno | |
| 6,961,711 B1 | 11/2005 | Chee | |
| 6,974,077 B1 | 12/2005 | Beyder et al. | |
| 6,999,825 B2 | 2/2006 | Inomata | |
| 7,013,289 B2 | 3/2006 | Horn et al. | |
| 7,068,149 B2 | 6/2006 | Lee et al. | |
| 7,844,507 B2 | 11/2010 | Levy et al. | |
| 2002/0010515 A1* | 1/2002 | Fukuoka et al. | 700/9 |
| 2002/0046133 A1 | 4/2002 | Sheth | |
| 2003/0158796 A1* | 8/2003 | Balent | 705/28 |
| 2003/0222760 A1 | 12/2003 | Hara | |
| 2004/0015393 A1 | 1/2004 | Fong et al. | |
| 2004/0243426 A1 | 12/2004 | Hashimoto | |
| 2004/0254802 A1 | 12/2004 | Miller et al. | |
| 2005/0165612 A1 | 7/2005 | Van Rysselberghe | |
| 2005/0190037 A1 | 9/2005 | Shitan et al. | |
| 2007/0247276 A1 | 10/2007 | Murchison et al. | |
| 2007/0247277 A1 | 10/2007 | Murchison et al. | |
| 2007/0250409 A1* | 10/2007 | Levy | 705/28 |
| 2008/0040946 A1* | 2/2008 | Slutsky | 34/528 |
| 2009/0179735 A1 | 7/2009 | Van Rysselberghe | |
| 2009/0302105 A1 | 12/2009 | Cassady et al. | |

FOREIGN PATENT DOCUMENTS

| | | | | |
|---|---|---|---|---|
| JP | 07230580 | | 8/1995 | |
| JP | 11184934 | | 7/1999 | |
| JP | 11184934 | * | 9/1999 | G06F 17/60 |
| JP | 2002136800 | | 5/2002 | |
| JP | 2002245158 | | 8/2002 | |
| JP | 2007296315 | * | 11/2007 | D06F 93/00 |
| KR | 10-2005-0030784 | | 3/2005 | |
| KR | 10-2006-0121444 | | 11/2006 | |

OTHER PUBLICATIONS

Garde-Robe website pages as of Apr. 18, 2005.

Sycamore System Publication (American Drycleaner 71, 4, 35 (28), Jul. 2004.

International Search Report Dated Jun. 13, 2013 in PCT/US2011/062920.

* cited by examiner

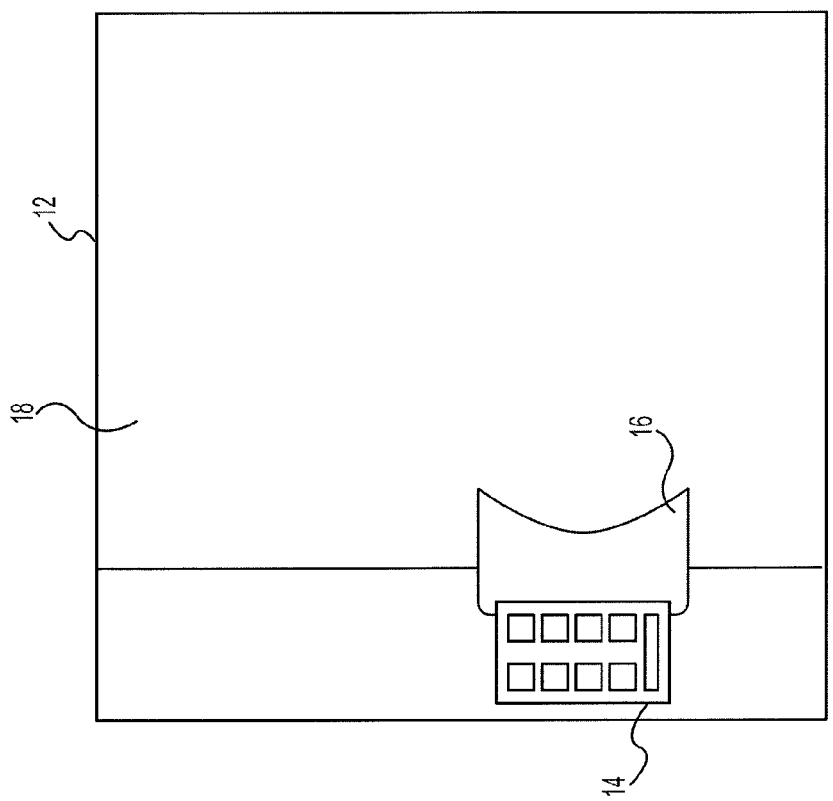

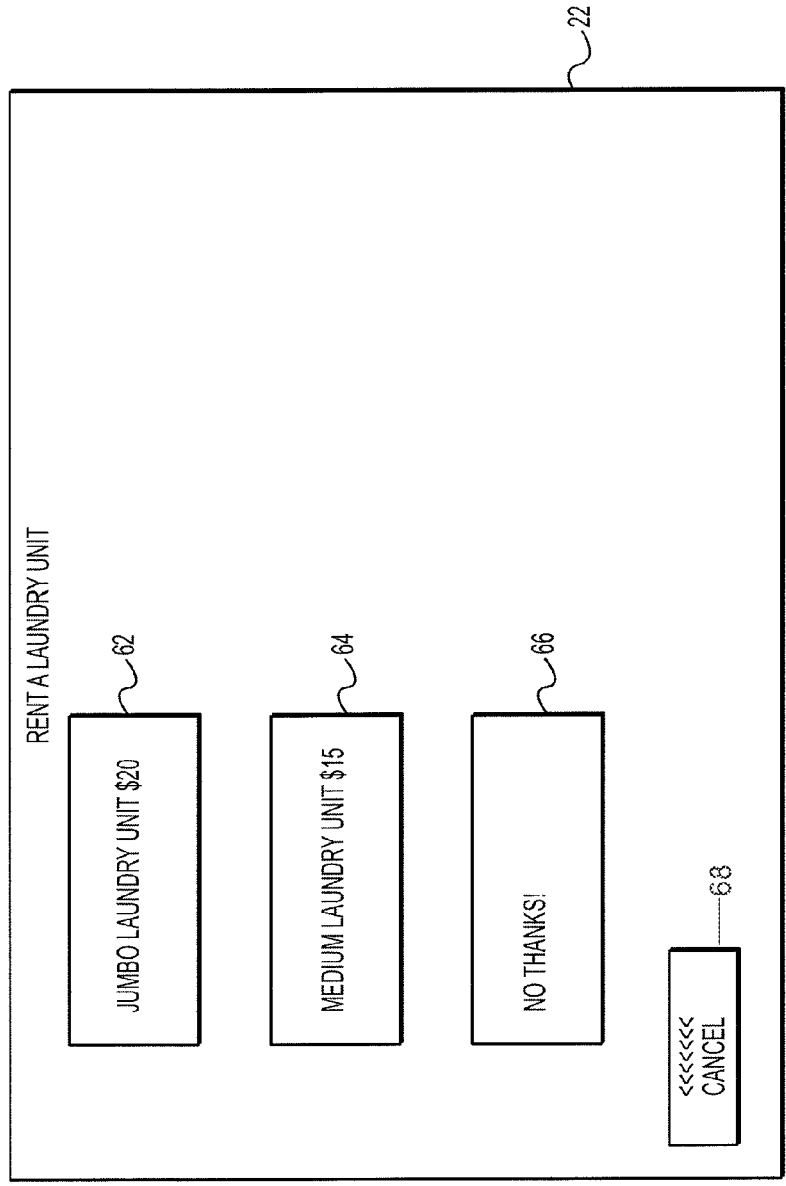

PLEASE CHOOSE YOUR LAUNDRY OPTIONS

| | |
|---|---|
| 70 — STANDARD DETERGENT, FABRIC SOFTENER, AND BLEACH | $0 |
| 71 — NO BLEACH! | $0 |
| 72 — NO FABRIC SOFTENER! | $0 |
| 73 — GREEN SERVICE (GREEN SOAP AND NO PLASTIC PACKAGING) | $0 |
| 74 — SEPARATE COLORED LAUNDRY AND BLEACH WHITE LAUNDRY | $3 |
| 75 — PREMIUM SERVICE | $3 |
| 76 — NEW LAUNDRY BAG | $5 |

78 — <<<<< CANCEL

*FIG. 5B*

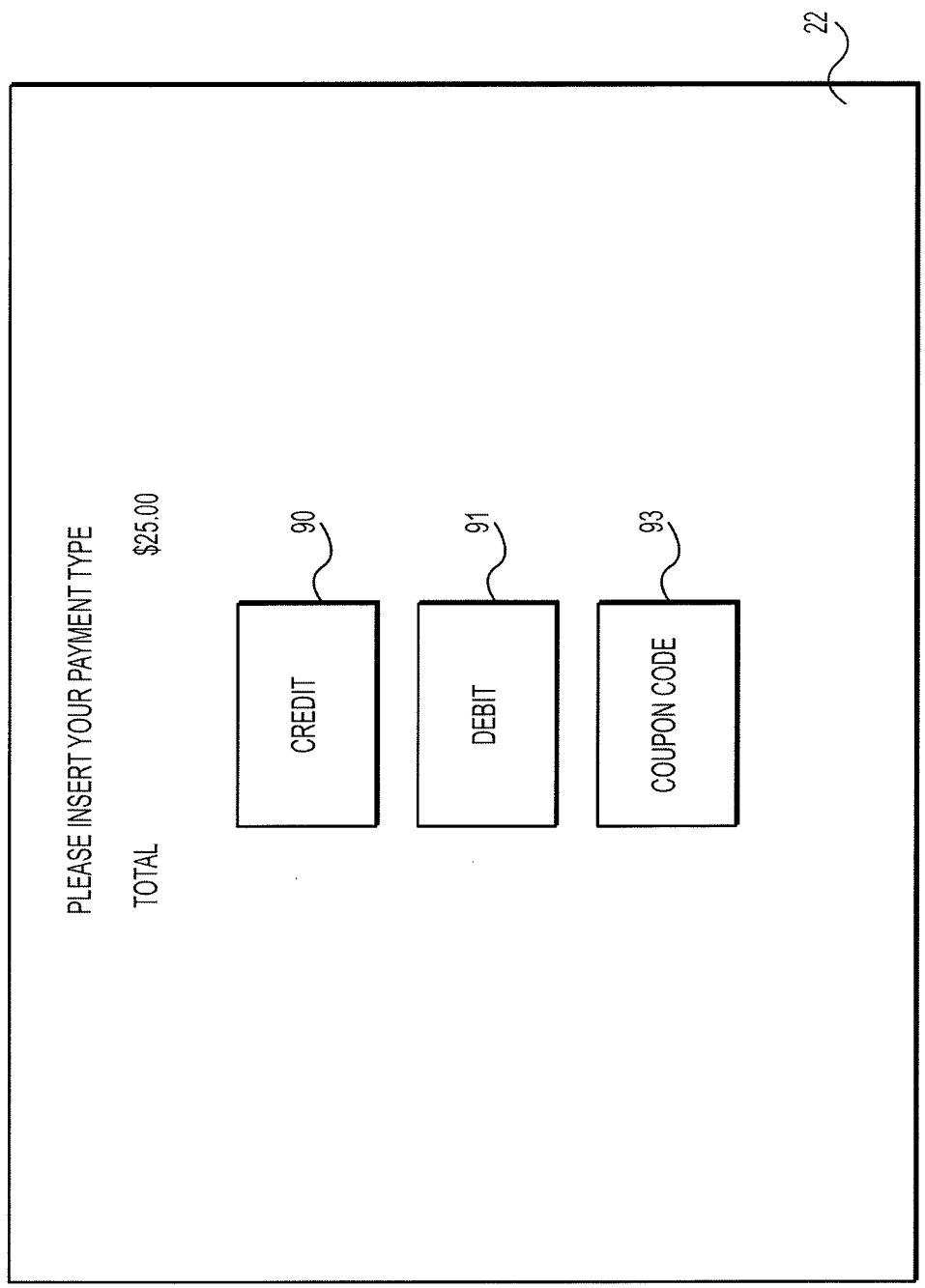

METHOD AND SYSTEM FOR PROVIDING LAUNDRY SERVICES

FIELD OF THE INVENTION

The present invention relates in general to a method and system for providing laundry services. More particularly, the present invention relates to a method and system for providing laundry services, such as wash, dry, and fold laundry services, that makes use of a laundry station including an interactive point-of-sale device for collecting payment information and one or more laundry unit containers having various sizes that correspond to the volumes of washing machines.

BACKGROUND OF THE INVENTION

Wash, dry, and fold laundry services are found throughout the United States and in foreign countries where commercial laundry services are provided to the retail public. All segments of the adult population utilize these services to varying degrees. Indeed, a number of working adults, students, and retirees commonly avail themselves of these services as a means to reallocate their time to other more important or more enjoyable tasks, or to simply avoid doing the laundering tasks themselves. The Coin Laundry Association ("CLA"), the national trade association to the laundromat industry, estimates that approximately 64% of all laundromats in the United States (i.e., over 19,000 stores) provide wash, dry, and fold services. Further, it is thought that more than 80% of the orders that are processed for wash, dry, and fold services are done so by the customer bringing their laundry to the laundromat to be serviced and then returning to the laundromat to pick-up their order at an expected completion time.

For the remaining orders that are still facilitated through a traditional pick-up and delivery process, however, there currently exists several, longstanding logistical challenges, the least of which is justifying the cost of the vehicle and driver. For instance, in most cases, the service charge for a wash, dry, and fold service is based on the weight of the order, and will thus vary depending upon the amount of clothes needing to be serviced. This variance in the amount of clothes needing to be laundered though frequently causes the traditional pick-up and delivery process to be economically prohibitive for some vendors and has thus forced some vendors to charge a minimum for their laundry services, regardless of the weight of the order. However, even when vendors charge a minimum price, it is still the case that laundry orders that are processed via the traditional pick-up and delivery process must still be weighed at the time of pick-up or upon returning to the laundromat, and thus still require an extra step for the vendor.

As another example of the logistical challenges that are common with traditional pick-up and delivery laundry processes, it should also be noted that many laundromat operators have avoided the pick-up and delivery of wash, dry, and fold orders because of the great dispersion of customer locations and because of the variables that are associated with synchronizing pick-up and delivery times with the customers in order to facilitate the process itself as well as payment by the customers. Payment for wash, dry, and fold services has traditionally occurred either at the time of the pick-up of the order, if the customer is available, or afterward. However, this process is grossly inefficient as it requires either the driver facilitating the pick-up of the order to also function as a cashier for the transaction, or it requires the laundromat to develop a billing system and procedure that monitors the accounts for the picked up but unpaid transactions.

Accordingly, a new method and system for providing laundry services, including wash, dry, and fold laundry services, that does not rely on the customer traveling to a laundromat to bring their soiled laundry for servicing and then returning to pick-up their completed order would be highly convenient and potentially desirable to all customer segments taking advantage of the service.

SUMMARY OF THE INVENTION

It is thus an object of the present invention to provide a method and system for providing laundry services, including wash, dry, and fold laundry services, that makes use of a laundry station including an interactive point-of-sale device for collecting payment information and one or more laundry unit containers having a size that corresponds to the volume of a washing machine typically used for servicing such retail orders. The present invention is capable of providing laundry services to individuals at locations that are convenient to their daily habits, and is also capable of collecting payment for the laundry services at the time the laundry is dropped off and in a manner that is not dependent on the weight of the laundry that is provided, thus avoiding the burden of later having to collect payment for laundry services based on the weight of the laundry order.

These and other objects are provided by virtue of the present invention which comprises methods and systems for performing laundry services. In a preferred implementation of a method and system for providing laundry services of the present invention, a laundry station is first provided that includes an interactive point-of-sale device operably connected to one or more laundry unit containers for housing items to be laundered. The interactive point-of-sale device is generally in the form of a kiosk that includes a micro-computer and a touch screen display to facilitate the use of the laundry station without the assistance of an attendant. In this regard, the interactive point-of-sale device further includes a payment card reader and a printer operably connected to the micro-computer such that payment information can be collected and processed and a receipt can be provided to the customer at the same time that the customer orders his or her laundry services. In other words, each interactive point-of-sale device includes the hardware and software necessary to carry out the receipt and acceptance of an order for laundry services from a customer, including the collection of payment information from the customer.

Following the provision of the laundry station, the entering and acceptance of an order for laundry services commences when a customer touches the touch screen of the interactive point-of-sale device. Through the use of the touch screen, the customer is first prompted to select the size of the laundry unit container that the customer would like to purchase and, in response, the customer inputs information relating to the desired size of the laundry unit container. In some implementations, a single laundry station includes about twelve to about forty-eight laundry unit containers or more. However, regardless of the number of laundry unit containers that are included in a particular laundry station, the size of each of the laundry unit containers typically corresponds to the cubic volume of a washing machine such that the laundry that is placed in one laundry unit container can be inserted into a single washing machine as desired. In some implementations, the size of each laundry unit container can be sized in the range of from about 2.5 cubic feet to about 3.5 cubic feet or greater. In some implementations, the system may include at least one laundry unit container which is about 2.5 cubic feet in volume and at least one laundry unit container which is about 3.5 cubic feet in volume, corresponding to a 18-pound wash load or a 25-pound wash load, respectively.

In any event, upon receipt of the selected size of laundry unit container, the interactive point-of-sale device then retrieves a selection of laundry services, including a selection of cleaning agents and a selection of finishing services, from a database, and presents the selection of laundry services to the customer such that the customer can input a selection of cleaning services and include them as part of his or her order.

Following the selection of desired laundry services, payment information is solicited and collected from the customer. The payment information is then processed by using a payment processing software application that is executed by the micro-computer that is housed in the interactive point-of-sale device. In a preferred implementation, the payment information is typically provided in the form of a card having a magnetic strip, such as a credit card, debit card, smart card, loyalty card, or the like that can be read by a standard payment card reader. In other implementations, the payment information can be collected by using a scanning device or other card reading device that is capable of interfacing with the micro-computer housed in the interactive point-of-sale device and the associated payment processing software.

Regardless of the particular method of payment chosen by the customer or the type of payment information collection device utilized, after the payment information has been collected and processed, customer identifying information is then collected from the customer to assist in later notifying the customer that the laundry services order has been fulfilled. For example, the customer identifying information can include an email address and/or a telephone number such that the customer can later be contacted via an email message, text message, or automated telephone call and notified that the order has been fulfilled. In some implementations, the customer identifying information also includes input from the customer as to whether the customer wishes to be notified at all upon fulfillment of the order for laundry services.

Once the payment information has been collected and processed, the interactive point-of-sale device then prompts the customer to create and establish a personalized access mechanism for allowing access to the designated laundry unit container. In some implementations, the personalized access mechanism is selected from a biometric identifier (e.g., a thumb print) or a bar code. In other implementations, the interactive point-of-sale device prompts the customer to create a personalized pass code as a personalized access mechanism and, optionally, prompts the customer to confirm their personalized code.

After the personalized access mechanism has been established by the interactive point-of-sale device, the customer is then directed to place their laundry in the designated laundry unit container corresponding to the size of the unit that was previous chosen by the customer, and does so by utilizing the personalized access mechanism that was previously established (e.g., by entering their personalized pass code in a keypad that is included on the front of the laundry unit container as part of a means for securing the laundry unit container). Then, once the items to be laundered have been placed in the laundry unit container, the interactive point-of-sale device receives a signal from the laundry unit container that it is occupied and prints a receipt for the customer, which includes the total charge for the laundry services and also includes the laundry unit container number in which the items to be laundered were placed and from which the laundered items will later be retrieved.

Upon the receipt of the signal from the laundry unit container that the unit is occupied by the items to be laundered, the interactive point-of-sale device also generates an electronic message to instruct the laundry station operator to fulfill the order. That electronic message, along with the order itself, is then communicated by the interactive point-of-sale device, or another sub-system, to a laundry station operator, who then is able to obtain the items to be laundered from the laundry unit container and, subsequent to completing the order, return the laundered items to the same laundry unit container. Alternatively, the electronic message, along with the order itself, may be communicated by the interactive point-of-sale device directly to a laundry services provider, who then is able to obtain the items to be laundered from the laundry unit container, fulfill the order, and return the laundered items to the same laundry unit container.

Upon return of the laundered items, if the customer indicated when placing the order that they wished to be notified upon fulfillment of the order, the interactive point-of-sale device or other sub-system then transmits an electronic message to the customer, such as an email or text message, to notify the customer of the fulfillment of the order. Alternatively, and depending on the particular notification method selected by the customer, the interactive point-of-sale device can also place an automated telephone call to the customer to notify the customer of the fulfillment of the order. After the removal of the laundered items by the customer, the interactive point-of-sale device then generates a second electronic message to notify the laundry station operator or laundry services provider that the laundered items have been retrieved by the customers and that the laundry station is ready for a new customer.

These implementations as well as other alternatives and modifications within the spirit and scope of the presently-disclosed invention will become readily apparent to those of ordinary skill in the art after a study of the description, Figures, and non-limiting Examples in this document.

BRIEF DESCRIPTION OF THE DRAWING FIGURES

FIG. 3 is a front view of an exemplary means for securing a laundry unit container, including a keypad for entering a pass code;

Figure 4A:
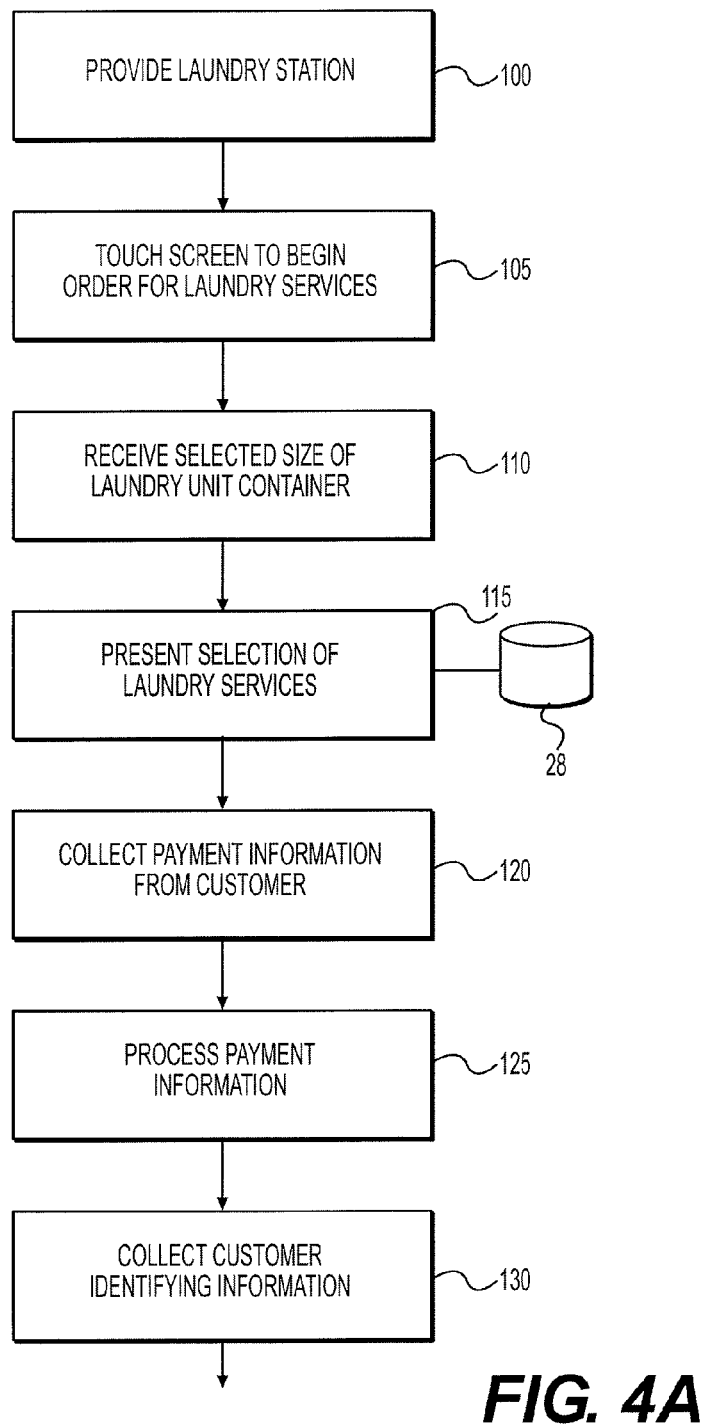
Figure 4B:
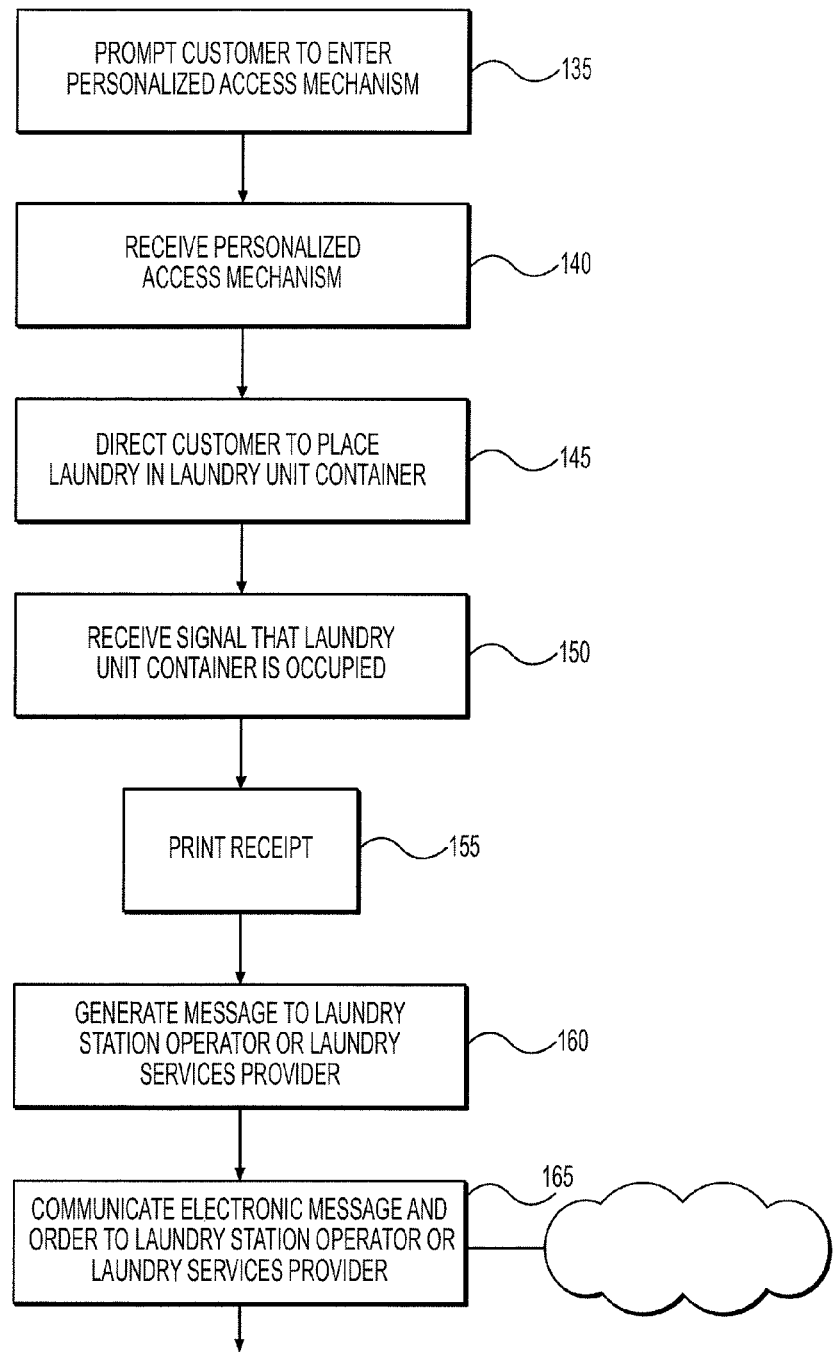
Figure 4C:
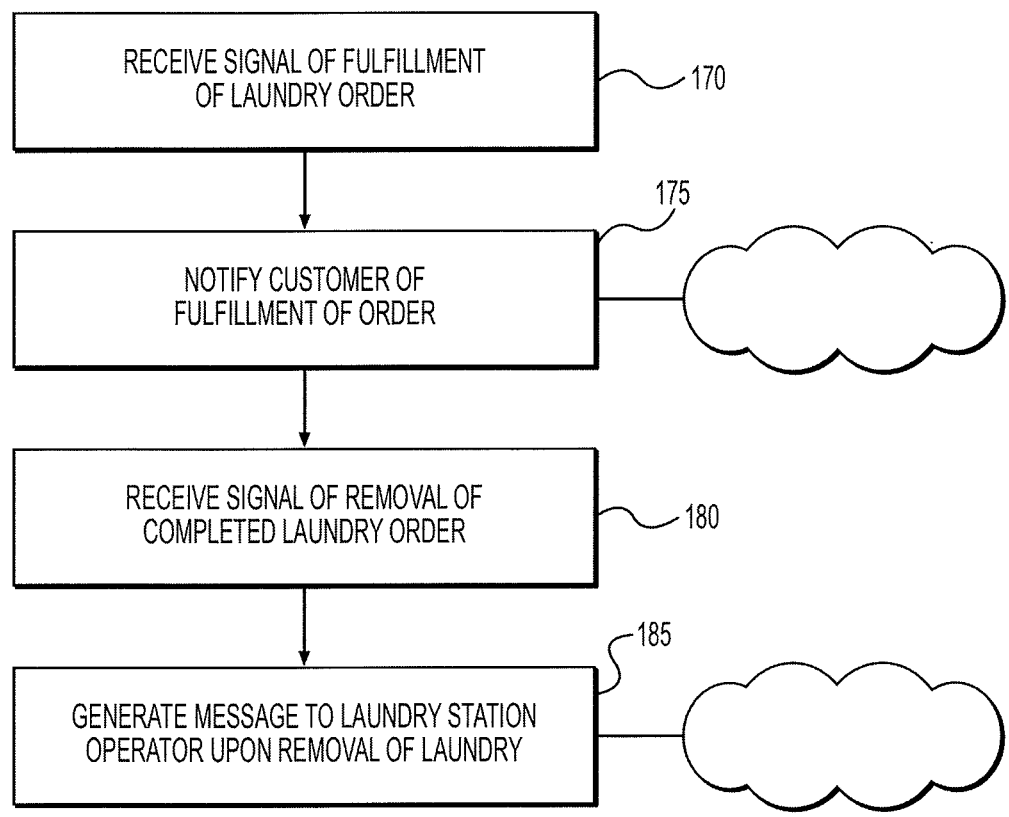
Figure 6:
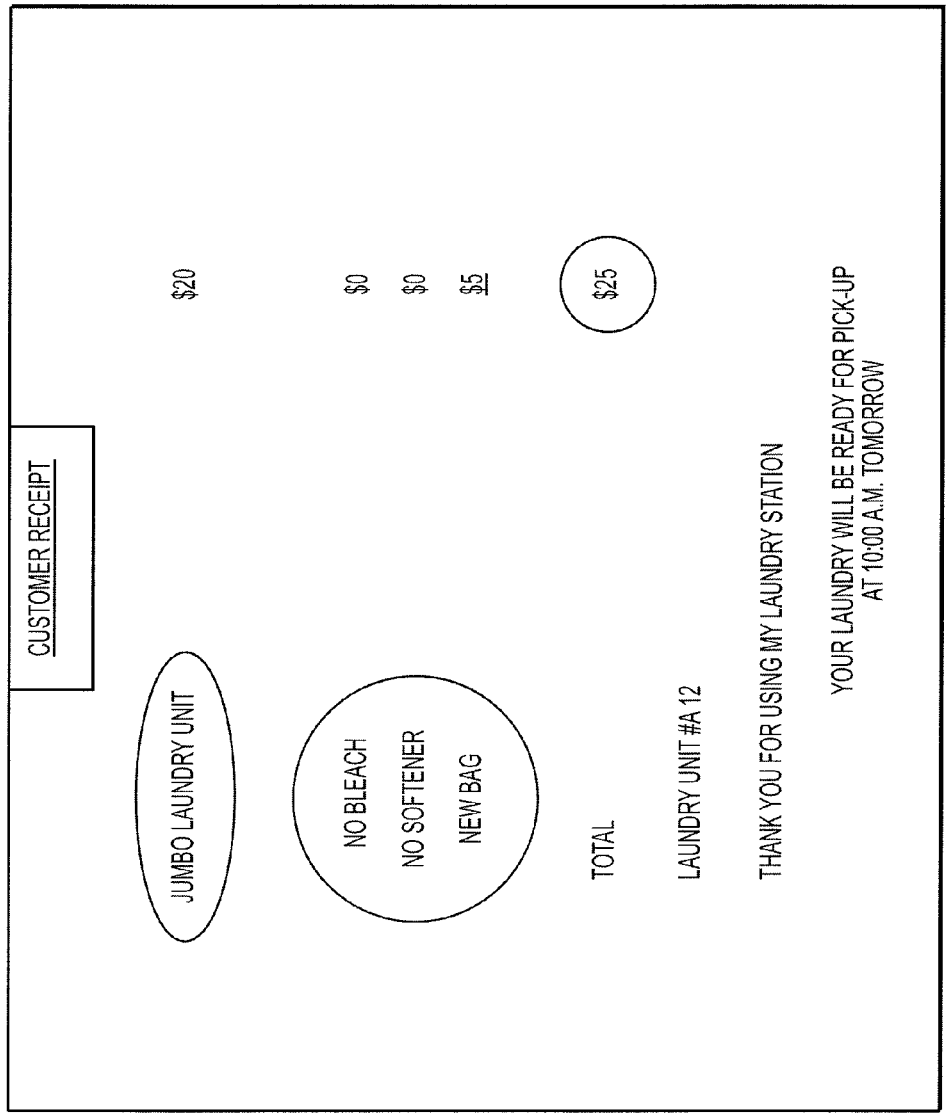
Figure 7:
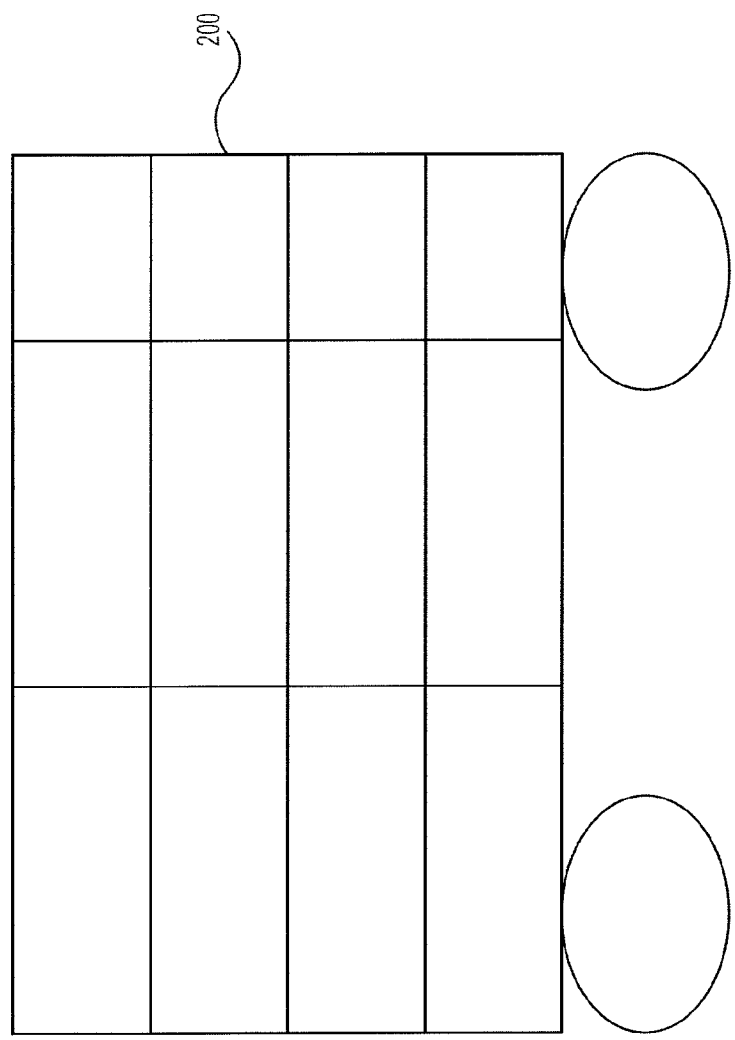

FIGS. 4A-4C include a flow chart depicting the steps included in an exemplary implementation of a method for providing laundry services in accordance with the present invention;

FIGS. 5A-5F are exemplary representations of the screens displayed on the interactive point-of-sale device in the exemplary implementation of the method and system for providing laundry services of the present invention;

FIG. 6 is an exemplary representation of a customer receipt provided by the interactive point-of-sale device of the present invention; and FIG. 7 is an exemplary representation of a laundry carting system 200 in accordance with the present invention.

DETAILED DESCRIPTION OF THE PREFERRED EMBODIMENTS

In accordance with the present invention, methods and systems for providing laundry services are provided. In particular, the present invention provides methods and systems for providing laundry services that make use of an interactive point-of-sale device for collecting payment information and one or more laundry unit containers having a size that corresponds to the cubic volume of a commercial washing machine that is commonly used for retail orders.

Figure 1:
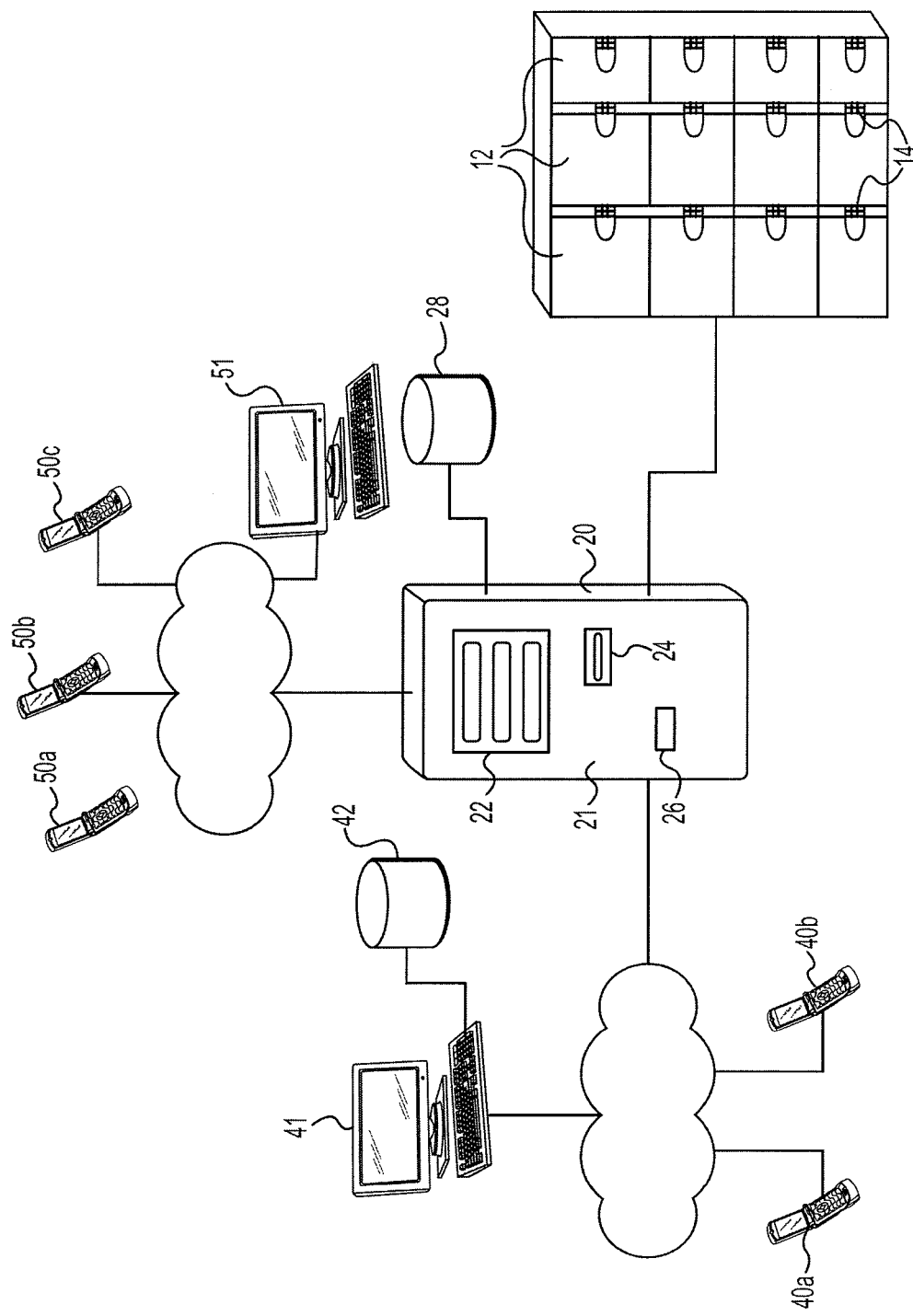
FIG. 1 is a schematic view of an exemplary implementation of the method and system for providing laundry services in accordance with the present invention, including an interactive point-of-sale device operably connected to twelve laundry unit containers.

FIG. 1 is a schematic view of an exemplary implementation of the method and system for providing laundry services of the present invention, including a laundry station comprising an interactive point-of-sale device 20, in communication with one or more laundry unit containers 12, and in communication with laundry station operators in order to instruct the operators to fulfill orders that are received and accepted by the interactive point-of-sale device 20, as described further below. As also described further below, the laundry station operator will then generally communicate an electronic message to a laundry services provider to fulfill the order, but alternatively, the station may operate by communicating directly with a laundry services provider who will fulfill the order. In general, order data and information is communicated from the interactive point-of-sale device 20 through an internet connection, satellite communications, or similar means of data transport to the cellular telephones 40a, 40b of laundry station operators or laundry services providers, or is communicated to a personal computer 41 of a laundry station operator or laundry services provider that houses a database 42 capable of storing the various laundry services orders. Likewise, data and information regarding the fulfillment of a laundry services order is communicated to the cellular telephones 50a, 50b, 50c of various customers or to the personal computer 51 of a customer to indicate the order has been completed and is ready for pick-up, as also described further below. Of course, order data and information can be provided to both the cellular telephone 40a, 40b and the personal computer 41 of the laundry station operator, and can be provided to the cellular telephone 50a, 50b, 50c and the personal computer 51 of the customer without departing from the spirit and scope of the present invention. Similarly, although a finite number of cellular telephones 40a, 40b, 50a, 50b, 50c and personal computers 41, 51 are illustrated in FIG. 1 for purposes of example, a virtually infinite number of cellular telephones or personal computers of various laundry station operators, laundry service providers, and/or customers can receive a communication from the interactive point-of-sale device 20 without departing from the spirit and scope of the present invention.

Figure 2:
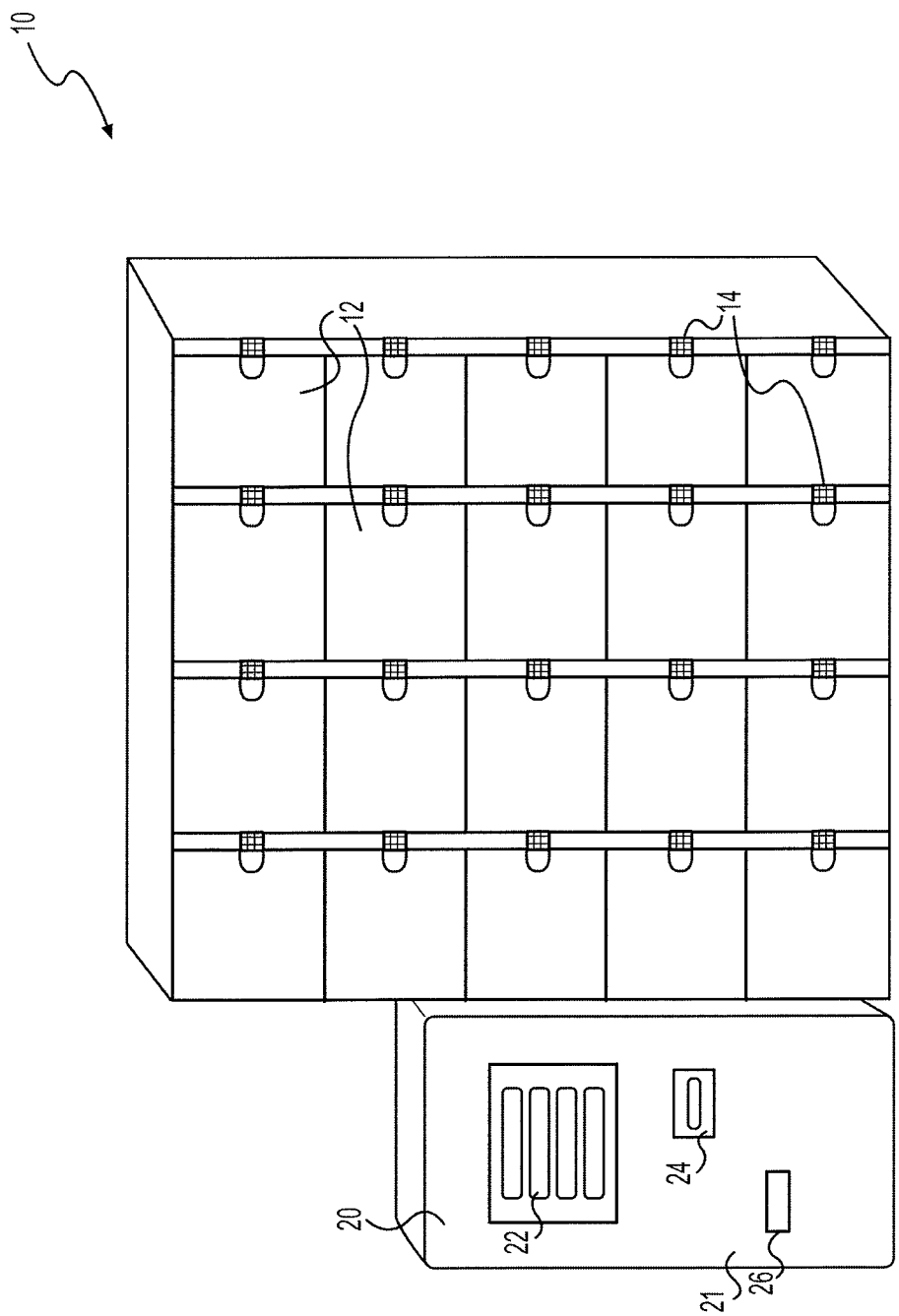
FIG. 2 is a perspective view of an exemplary laundry station of the present invention, including an interactive point-of-sale device and sixteen laundry unit containers, where the interactive point-of-sale device is in the form of a kiosk having a touch screen.

Referring now to FIGS. 1 and 2, the exemplary method and system for providing laundry services is generally designed to be a "self-service" method and system for placing orders for laundry services. In other words, a customer can drop-off, pay for, and pick-up laundry on his or her own without the assistance of an attendant. In this regard, the method and system of the present invention make use of an independent laundry station 10, where each interactive point-of-sale device 20 is generally in the form of a kiosk and is operably connected to the one or more laundry unit containers 12 by a cable or by wireless means. The interactive point-of-sale device 20 is comprised of a cabinet 21 that houses the necessary equipment for receiving and accepting an order for laundry services, including a micro-computer (not shown) that executes a software application for operating the interactive point-of-sale device and also generates various electronic messages depending on the status of an order. In some implementations, the microcomputer, also receives signals from the one or more laundry unit containers 12 as to whether the laundry unit containers 12 are currently housing a customer's laundry. Furthermore, the microcomputer is also capable of placing an automated telephone call to a customer after fulfillment of an order for laundry services.

In these exemplary embodiments, also housed in the cabinet 21 of the interactive point-of-sale device 20 and viewable through an opening in the front portion of the cabinet 21 is a touch screen 22 that serves as a display device and as an input device, as further described below. Finally, the cabinet 21 also houses a payment card reader 24 and a printer 26 for providing a receipt to the customer, both of which are accessible through openings in the cabinet 21 and are operably connected to the micro-computer of the interactive point-of-sale device 20 such that, in operation and subsequent to reading a payment card of a customer, the micro-computer can execute a software application to process payment by the customer and can then print a receipt for the customer, as also described further below. Of course, and although not shown in the exemplary embodiments illustrated in FIGS. 1 and 2, a paper currency/coupon acceptor, such as those installed in common vending machines, and/or a change/bill provider, such as those installed in automated teller machines, can also be incorporated into the interactive point-of-sale device 20 to facilitate payment of an order for laundry services without departing from the spirit and scope of the present invention.

As noted above, the interactive point-of-sale device 20 is operably connected to the one or more laundry unit containers 12, which, in some implementations, comprise about twelve to about forty-eight laundry unit containers or more (see FIG. 1 for an embodiment including twelve laundry unit containers; see also FIG. 2 for an embodiment including sixteen laundry unit containers). Each laundry unit container 12 typically defines a substantially square or rectangular volume of a size that, in certain embodiments, corresponds to the volume of a washing machine, such that the amount of laundry that is placed in the laundry unit container 12 corresponds directly to the amount of laundry that can be included in a single load of a commercial washing machine that is commonly used for retail orders. In this regard, in some implementations, the size (i.e., the volume) of each laundry unit container 12 may range from about 2.5 cubic feet to about 3.5 cubic feet, or preferably the station will contain at least one unit container of about 2.5 cubic feet and at least one unit container of about 3.5 feet such that an amount of laundry placed in the laundry unit container corresponds to the amount of laundry that can be placed in an 18-pound washing machine or a 25-pound washing machine, respectively.

Each laundry unit container 12 also typically comprises a means for securing the laundry unit container 12, which, in some embodiments, includes a personalized access mechanism. As perhaps best illustrated in FIG. 3, in some embodiments, the personalized access mechanism comprises a key pad 14 for entering a pass code. The key pad 14 is operably connected to the micro-computer of the interactive point-of-sale device 20 such that, once a preferred pass code is entered into the touch screen 22 of the interactive point-of-sale device 20, the pass code can then be relayed to the key pad 14. In this regard, once a preferred pass code for a specific key pad 14 has been set, only that particular pass code can be used to unlock the laundry unit container 12 during the fulfillment of a particular laundry services order. In such a system, to secure the door 18 of each laundry unit container 12, the key pad 14 is further in communication with a locking mechanism 16 that is incorporated into each laundry unit container 12. Various other personalized access mechanisms can also be used in accordance with the present invention, including, but not limited to, bar code scanning devices, biometric systems and scanning devices, and other electronic means for securing a laundry unit container, as described further below.

Referring now to the flow chart of FIGS. 4A-4C, in this exemplary implementation of the method and system of the present invention, the provision of laundry services commences by providing a laundry station in accordance with the present invention to allow a customer to place an order for laundry services, as indicated by block 100. The ordering of the laundry services then begins when a customer approaches the interactive point-of-sale device and touches the touch screen, as indicated by block 105. Through the use of the touch screen, the customer is then preferably prompted to select the size of the laundry unit container that the customer would like to purchase and, in response, the customer inputs information relating to the desired size of the laundry unit container, which is subsequently received by the interactive point-of-sale device, as indicated by block 110.

As noted above, the size of each of the laundry unit containers included in a laundry station of the present invention typically corresponds to the cubic volume of a washing machine such that the laundry that is placed in one laundry unit container can be cleaned in a single load of a washing machine if desired. In this regard, in some implementations, the touch screen 22 can provide a first option 62 corresponding to a laundry unit container having a size of about 3.5 cubic feet and approximately 25 pounds of laundry (e.g., a "Jumbo Laundry Unit"), or the touch screen 22 can provide a second option 64 corresponding to a laundry unit container having a size of about 2.5 cubic feet and approximately 18 pounds of laundry (e.g., a "Medium Laundry Unit"), as shown in FIG. 5A. Of course, the touch screen 22 can also provide the customer with an option 66 of not selecting either size of laundry unit container, and can also provide the customer with the option 68 of cancelling the order and returning to the previous screen, as also shown in FIG. 5A and as option 78 in FIG. 5B.

In any event, and referring again to the flow chart of FIGS. 4A-4C, upon receipt of the selected size of laundry unit container, the interactive point-of-sale device then retrieves a selection of laundry services from a database 28, and presents the selection of laundry services to the customer, as indicated by block 115. The selection of laundry services presented by the touch screen allows the customer to input a selection of cleaning agents and finishing services and include them as part of his or her order. As illustrated in the exemplary representation of the touch screen 22 shown in FIG. 5B, a number of laundry services can be selected by the customer in conjunction with the placing of an order for laundry services.

For example, in some implementations, in selecting the particular cleaning agents the customer wishes to have used, the customer can select from: an option 70 that includes standard detergent, fabric softener, and bleach; an option 71 that includes no bleach; an option 72 that includes no fabric softener; or an option 75 relating to a premium cleaning service making use of a premium detergent, a premium fabric softener, and a premium drying agent/sheet. As another example, in selecting the particular finishing services the customer wishes to be performed, the customer can select from: an option 74 to direct the laundry station services operator to separate the colored laundry and bleach the white laundry; or an option 76 to direct the laundry station operator or laundry services provider to place purchased retail items, such as a new laundry bag, with the laundered items upon their return. As yet another example, in some implementations, the customer can select an option that combines both a particular cleaning service and a particular finishing service into one option, such as a "green service" option 73 that directs the laundry station operator or laundry services provider to utilize an ecologically-friendly soap and no plastic packaging upon completion of the laundry service. This embodiment also provide the customer with the option 78 of cancelling the order and returning to the previous screen, as also shown in FIG. 5B.

Following the selection of the desired laundry services, and referring again to the flow chart of FIGS. 4A-4C, payment information is then solicited from and collected from the customer, as indicated by block 120. In this regard, the touch screen 22 can again be used to select the type of payment that will be provided. For example, in the exemplary representation of the touch screen 22 shown in FIG. 5C, the customer can view the total price of their laundry services and can then either select an option 90 for paying by credit card, an option 91 for paying by debit card, or an option 93 for entering a coupon code prior to entering any payment information. In a preferred implementation, the payment information is typically provided in the form of a card having a magnetic strip, such as a credit card, debit card, smart card, loyalty card, or the like that can be read by a standard payment card reader. In other implementations, the payment information can be collected by using a scanning device or other card reading mechanism that is capable of interfacing with the micro-computer housed in the interactive point-of-sale device and the associated payment processing software.

Referring yet again to the flow chart of FIGS. 4A-4C, once the customer selects a desired method of payment using the touch screen and the payment information is collected by the interactive point-of-sale device, the payment information is then processed, as indicated by block 125. With the use of cards having a magnetic stripe (e.g., credit cards, debit card, etc.) the payment information is generally processed by using a standard payment processing software application, such as standard merchant services software (e.g., merchant services software provided by First Data, Atlanta, Ga.), which is executed by the micro-computer that is housed in the interactive point-of-sale device.

Figure 5D:
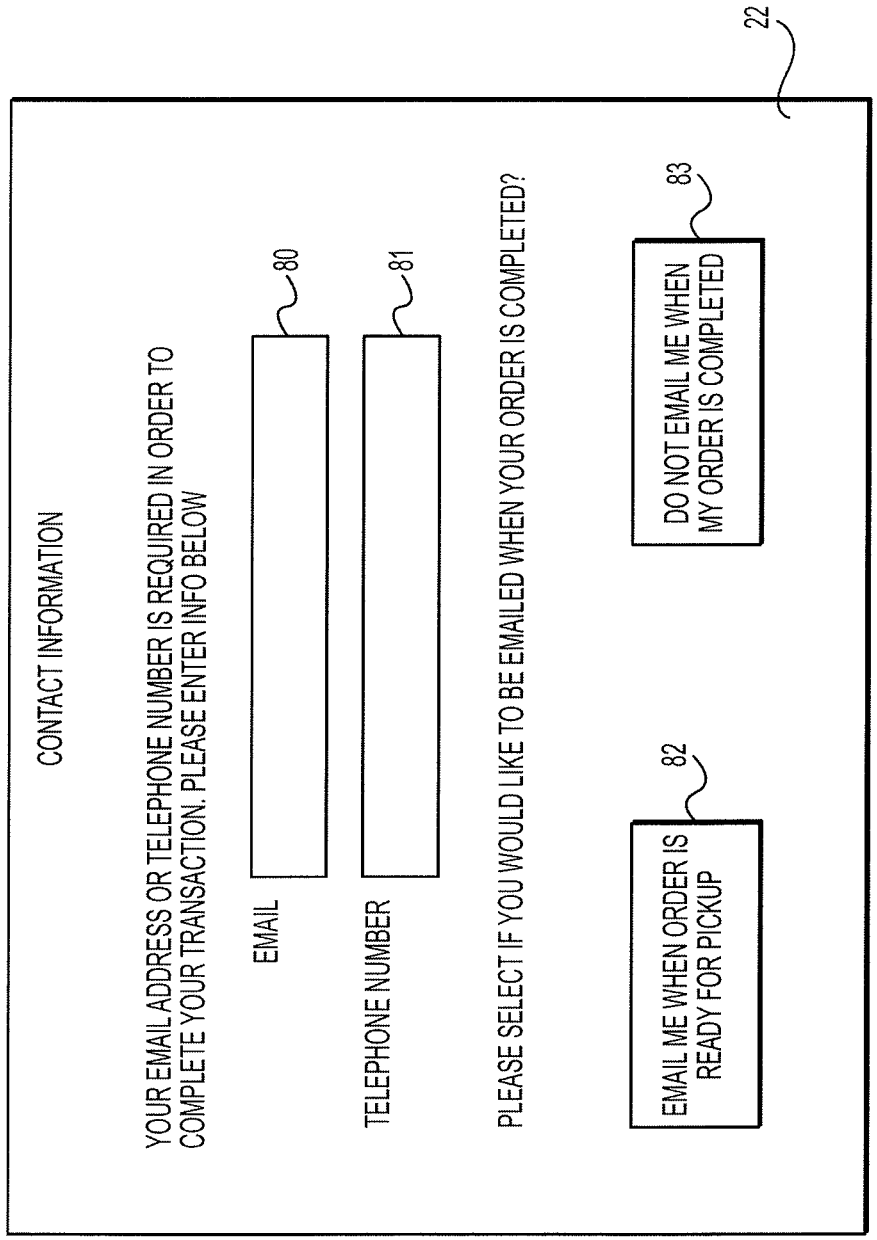

Once the payment information has been processed, customer identifying information is then collected from the customer to assist in later notifying the customer that the laundry services order has been fulfilled, as indicated by block 130. For example, as shown in FIG. 5D, the touch screen can provide an option 80 of entering an email address and/or an option 81 of entering a telephone number such that the customer can later be contacted via an email message, text message, or automated telephone call and notified that the order for laundry services has been fulfilled. The customer identifying information also typically includes input from the customer as to whether the customer wishes to be notified at all upon fulfillment of the order for laundry services. For instance, after the customer has entered an email address or telephone number, the touch screen 22 can then prompt the customer to either select an option 82 indicating that they would like to receive an email when the order is ready for pick-up or an option 83 indicating that they would not like to receive an email when the order is completed.

In any event, referring yet again to the flow chart of FIGS. 4A-4C, once the payment information has been collected and processed, the interactive point-of-sale device then prompts the customer to enter and is used to establish a personalized access mechanism to allow access to the laundry unit container, as indicated by block 135. For example, in some implementations, a bar code can be printed by the printer of the interactive point-of-sale device such that the bar code can later be scanned to allow access to a laundry unit container. In other implementations, the personalized access mechanism is a biometric identifier, such as a thumb print, that can be scanned by a biometric scanning device attached to the interactive point-of-sale device and used to allow access to a laundry unit container.

Figure 5E:
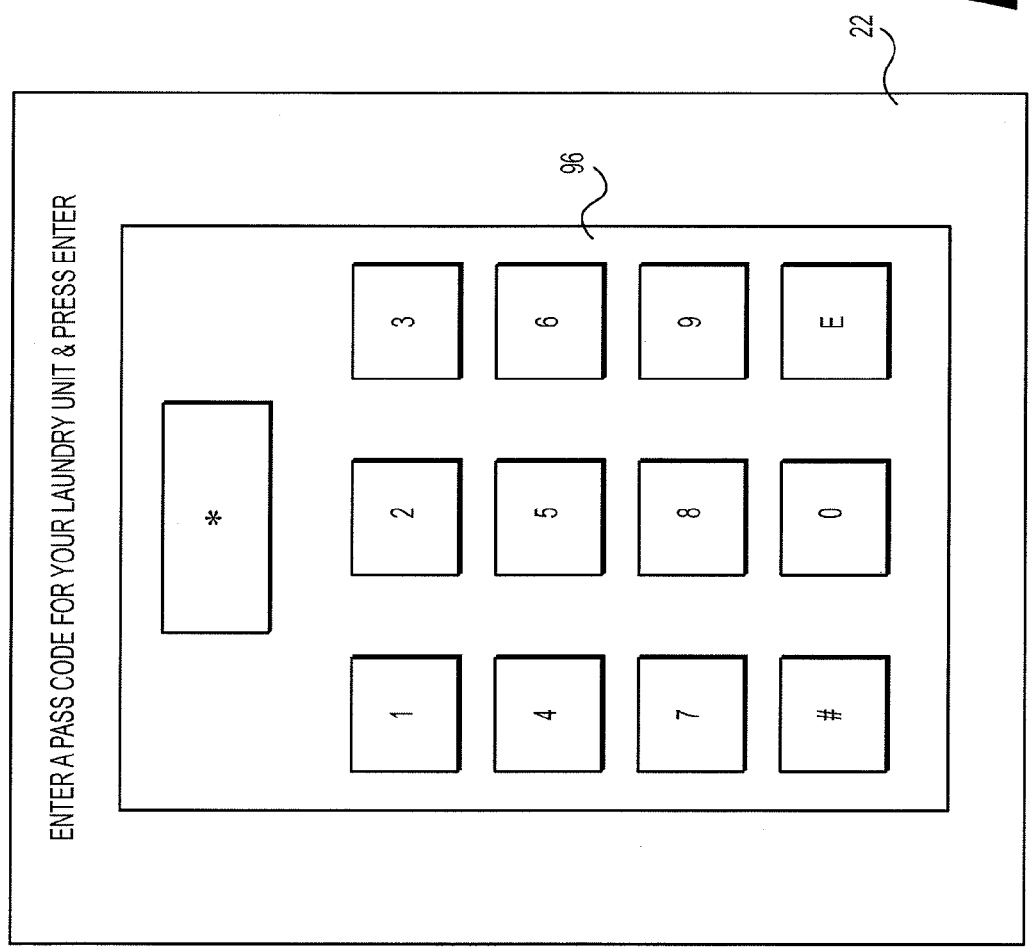

In one implementation, the interactive point-of-sale device prompts the customer to use the touch screen 22 to create a personalized pass code as a personalized access mechanism. In this regard, the personalized pass code is typically entered into the interactive point-of-sale device using a keypad option 96 on the touch screen 22, as shown in FIG. 5E. In some implementations, the interactive point-of-sale device then, optionally, prompts the customer to confirm their personalized code to ensure that the code that was intended to be entered by the customer was, in fact, entered. Once the pass code (i.e., the personalized access mechanism) has been entered into and received by the interactive point-of-sale device, as indicated by block 140 in FIG. 4B, the microcomputer then relays the pass code to the key pad on the laundry unit container, such that the personalized pass code that is entered by a particular customer allows access to the laundry unit container that is designated for that particular customer in response to the customer's order, and is the only pass code that can then be used at that particular key pad.

Figure 5F:
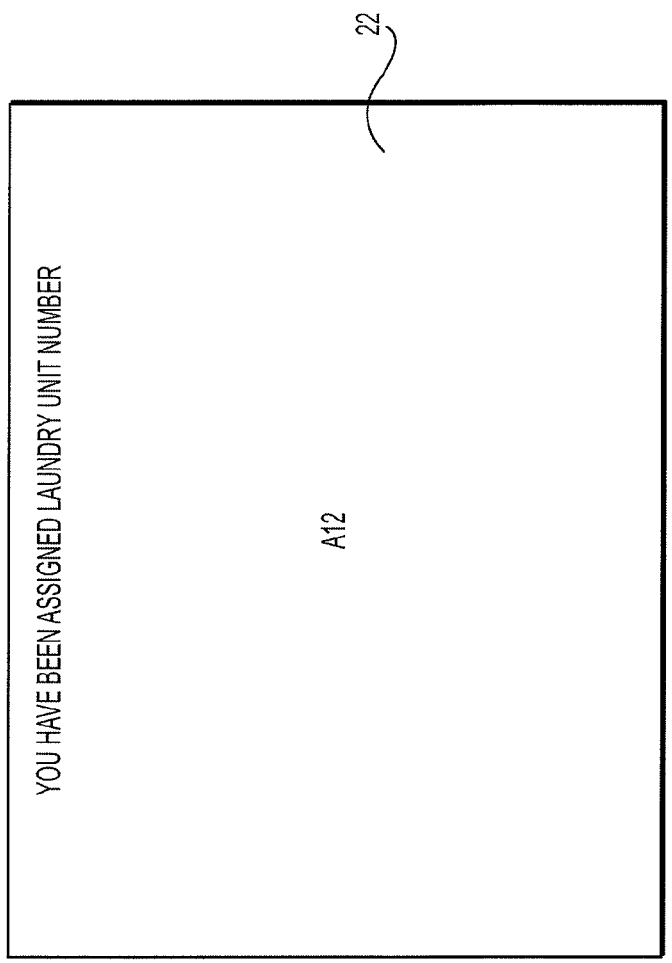

Once the personalized access mechanism has been received by the interactive point-of-sale device, the touch screen then directs the customer to place their laundry in the designated laundry unit container, as indicated by block 145 and as shown in the representation of the touch screen 22 in FIG. 5F. The customer then enters the personalized pass code, which was previously created by the customer, in the keypad that is included on the front of the laundry unit container. Upon entering the pass code into the key pad, the door to the laundry unit container unlocks and the customer is then able to place the items they wish to be laundered into the laundry unit container, and then close and lock the door to the laundry unit container.

Then, once the items to be laundered have been placed in the laundry unit container, the interactive point-of-sale device receives a signal from the laundry unit container that it is occupied, as indicated by block 150 in FIG. 4B. Various methods and devices known to those of ordinary skill in the art can be used to determine whether a laundry unit is occupied. In some implementations, the determination of whether the laundry unit is occupied is accomplished by the microcomputer monitoring the number of times the door to the laundry unit container is opened or closed subsequent to the placement of a laundry services order, such that after the door to the laundry unit container has been opened and closed once following the placement of an order, the micro-computer receives a signal that the laundry unit is occupied. In other implementations, each laundry unit container includes a sensor, such as a weight or motion sensor, that is in communication with the micro-computer and allows for a determination of whether the laundry unit container is occupied.

Once the interactive point-of-sale device receives a signal from the laundry unit container that it is occupied, the interactive point-of-sale device then prints a receipt for the customer, as indicated by block 155. The printed receipt 98 generally includes information regarding the total charge for the laundry services and also includes the laundry unit container number in which the items to be laundered were placed and from which the laundered items will later be retrieved, as shown in FIG. 6.

Referring once again to FIGS. 4A-4C, upon the receipt of the signal from the laundry unit container that the unit is occupied by items to be laundered, the interactive point-of-sale device, or another sub-system, also generates an electronic message to instruct the laundry station operator to fulfill the order, as indicated by block 160. That electronic message is then communicated to the laundry station operator or laundry services provider, as indicated by block 165. Alternatively, as provided herein, the electronic message may be transmitted in the first place directly to the laundry services provider.

In any event, a variety of methods known to those of ordinary skill in the art can be used to communicate an electronic message to the laundry station operator or laundry services provider in accordance with the present invention. For example, as noted above, the electronic message can be communicated to the laundry station operator or laundry services provider through an internet connection, satellite communications, or similar means of data transport to the cellular telephone of a laundry services provider or can be communicated to a personal computer 41 of a laundry services provider that houses a database 42 capable of storing the various laundry services orders. In some implementations, the electronic message and order is uploaded to a website, which then interacts with the merchant services software on the computer of a laundry station operator or laundry services provider to notify the operator or the provider that certain laundry unit containers have been purchased.

At this point in the process, the laundry station operator or laundry services provider then obtains the items to be laundered from the laundry unit container. When the laundry station operator or laundry station services provider arrives to pick-up the items to be laundered, the laundry station operator or laundry service provider typically enters a master access code by using the touch screen of the interactive point-of-sale device that allows the laundry services provider to unlock all of the laundry unit containers that are housing items to be laundered. The laundry station operator or laundry services provider is then able to verify the orders by using a manifest control report that can be printed using the micro-computer and/or merchant services software that is executed by the micro-computer to operate the interactive point-of-sale device. After review of the items to be laundered and the various orders, the laundry station operator or laundry services provider then places the items to be laundered in a specialized laundry carting system, as shown in FIG. 7, which includes a layout identical to that of the laundry unit containers of the laundry station so as to keep individual customer orders organized during transport and processing. After removal of the laundry, the laundry station operator or laundry services provider then relocks the doors to the laundry unit containers and transports the laundry for processing (e.g., overnight processing).

As indicated herein, in some implementations of the present invention, it is contemplated that the laundry station operator is a separate entity from the laundry services provider such that the laundry station operator receives the order and then communicates that order to a second entity (i.e., the laundry services provider) to perform the laundry services. In such an operation, the laundry station operator may be in communication with a plurality of laundry services providers so as to most conveniently and efficiently manage a plurality of laundry stations in different and possibly remote locations. However, in other implementations, it is contemplated that the interactive point-of-sale device generates an electronic message and communicates the electronic message and the order for laundry services directly to the laundry services provider, who then launders the various items. In yet further embodiments, it is contemplated that the laundry station operator is the same entity that launders the clothes or, in other words, the laundry station operator is also the laundry services provider.

In any event, and regardless of whether the laundry service operator is the same entity that launders the various items, upon return of the laundered items to the designated laundry unit container, the interactive point-of-sale device receives a signal that the laundered items have been returned to (i.e., placed within) the laundry unit container, as indicated by block 170. Similar to the signal that is generated upon placing the items in the laundry unit container, the signal that the laundered items have been returned can also be sent in response to input received by the micro-computer from the opening or closing of the door of the laundry unit container or from various sensors that can be incorporated into the laundry unit container. Then, if the customer indicated when placing the order that they wished to be notified upon fulfillment of the order, the interactive point-of-sale device, or other sub-system, transmits an electronic message to the customer, such as an email or text message, to notify the customer of the fulfillment of the order, as indicated by block 175. Alternatively, and depending on the particular notification method selected by the customer, the interactive point-of-sale device, or other sub-system, can also place an automated telephone call to the customer to notify the customer of the fulfillment of the order.

When the customer returns to remove the laundered items, the customer simply enters the pass code into the keypad of the laundry unit container, or utilizes another personalized access mechanism as appropriate, and removes the laundered items. As noted above, if a pass code is utilized as a personalized access mechanism, the pass code that is used to re-access the laundry unit container is generally the same pass code that was selected by the customer at the time the order for laundry services was placed, thus assuring that only the customer, the laundry station operator, and/or the laundry services provider had access to the laundry unit container.

Following the subsequent removal of the laundered items by the customer, the interactive point-of-sale device then receives a signal from the laundry unit container that the completed laundry order has been removed, as indicated by block 180, to signal that the laundry unit container is ready to receive another order. The interactive-point-of sale device then clears the pass code, or other personalized access mechanism, that was previously entered for that particular laundry unit container, and generates and communicates a second electronic message to the laundry station operator to notify the operator that the laundered items have been retrieved by the customers and that the laundry unit container is ready for a new customer, as indicated by block 185.

The above-described systems and methods of providing laundry services are thus important for providing laundry services, including wash, dry, and fold services, to customers that are constantly on the move, but are also important for providing systems and methods whereby payment information can be collected at the time the laundry is dropped off to be laundered. Furthermore, by making use of laundry unit containers having a size that corresponds to the volume of a commercial washing machine, the systems and methods of the present invention are not only able to provide a customer with a fixed price laundry service that is not dependent on the weight of the clothes, but are also able to provide a laundry station operator or and/or laundry services provider with an indication of the volume of clothes that are to be laundered.

Thus, the methods and systems of the present invention provide numerous convenient alternatives to traditional drop-off and pick-up wash, dry, and fold laundry services, with the added benefit that the presently-disclosed methods and systems can effectively be utilized to obtain payment for the laundry services at the time of placing the order and can be utilized to provide an amount of laundry that corresponds to the volume of a commercial washing machine used for retail orders.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to understood therefrom, for modifications will become apparent to those skilled in the art upon reading this disclosure and may be made without departing from the spirit or scope of the presently-disclosed subject matter.

What is claimed is:

1. A method for providing laundry services, comprising the steps of:
    providing a laundry station having an interactive point-of-sale device operably connected to one or more laundry unit containers for housing items to be laundered, such that a customer can place an order for laundry services;
    receiving and accepting the order for laundry services from a customer at the laundry station, including collecting payment information from the customer at the laundry station;
    providing information directing the customer to place their laundry in a designated or chosen laundry unit container in response to the order received from the customer;
    upon completion of the customer placing their laundry in the designated or chosen laundry unit container, generating an electronic message to the customer confirming the details of the order including the designated or chosen laundry unit container in which the order was originally placed;
    generating an electronic message to instruct a laundry station operator or a laundry services provider to fulfill the order; and
    communicating the electronic message and the order to the laundry station operator or the laundry services provider, whereby the laundry station operator or the laundry services provider can obtain the items to be laundered from the designated or chosen laundry unit container in which the order was originally placed to fulfill the order and return the laundered items to the same designated or chosen laundry unit container in which the order was originally placed,
    further comprising the step of collecting customer identifying information, and
    further comprising the step of, upon fulfillment of the order for laundry services by the laundry station operator or the laundry services provider, transmitting an electronic message to the customer to notify the customer of the completion of the order and its return to the designated or chosen laundry unit container in which the order was originally placed.

2. A method for providing laundry services, comprising the steps of:
    providing a laundry station at a site accessible to customers having an interactive point-of-sale device operably connected to one or more laundry unit containers for housing items to be laundered, such that a customer can place an order for laundry services;

receiving and accepting the order for laundry services from a customer at the laundry station, including collecting payment information from the customer at the laundry station;

providing information directing the customer to place their laundry in a designated or chosen laundry unit container in response to the order received from the customer;

upon completion of the customer placing their laundry in the designated or chosen laundry unit container, generating an electronic message to the customer confirming the details of the order including the designated or chosen laundry unit container in which the order was originally placed;

generating an electronic message to instruct a laundry station operator or a laundry services provider to fulfill the order; and communicating the electronic message and the order to the laundry station operator or the laundry services provider, whereby the laundry station operator or the laundry services provider can obtain the items to be laundered from the designated or chosen laundry unit container to fulfill the order and return the laundered items to the same designated or chosen laundry unit container in which the order was originally placed, further comprising the step of establishing a personalized access mechanism prior to providing information directing the customer to place the laundry in the designated or chosen laundry unit container, the personalized access mechanism for allowing access to the laundry unit container; and further comprising the step of, upon fulfillment of the order for laundry services by the laundry station operator or the laundry services provider, transmitting an electronic message to the customer to notify the customer of the completion of the order and its return to the designated or chosen laundry unit container in which the order was originally placed.

3. The method of claim 2, wherein the step of establishing a personalized access mechanism includes requesting a personalized pass code from the customer.

4. The method of claim 2, wherein the personalized access mechanism is selected from the group consisting of a biometric identifier and a bar code.

5. A method for providing laundry services, comprising the steps of:

providing a laundry station having an interactive point-of-sale device operably connected to one or more laundry unit containers for housing items to be laundered, such that a customer can place an order for laundry services;

receiving and accepting the order for laundry services from a customer at the laundry station, including collecting payment information from the customer at the laundry station;

providing information directing the customer to place their laundry in a designated or chosen laundry unit container in response to the order received from the customer;

upon completion of the customer placing their laundry in the designated or chosen laundry unit container, generating an electronic message to the customer confirming the details of the order including the designated or chosen laundry unit container in which the order was originally placed;

generating an electronic message to instruct a laundry station operator or a laundry services provider to fulfill the order; and communicating the electronic message and the order to the laundry station operator or the laundry services provider, whereby the laundry station operator or the laundry services provider can obtain the items to be laundered from the designated or chosen laundry unit container to fulfill the order and return the laundered items to the same designated or chosen laundry unit container in which the order was originally placed, further comprising the step of, upon placement of the laundry in the designated or chosen laundry unit container in which the order was originally placed, receiving a signal that the laundry unit container is occupied; and further comprising the step of, upon fulfillment of the order for laundry services by the laundry station operator or the laundry services provider, transmitting an electronic message to the customer to notify the customer of the completion of the order and its return to the designated or chosen laundry unit container in which the order was originally placed.

6. A method for providing laundry services, comprising the steps of:

providing a laundry station having an interactive point-of-sale device operably connected to one or more laundry unit containers for housing items to be laundered, such that a customer can place an order for laundry services;

receiving and accepting the order for laundry services from a customer at the laundry station, including collecting payment information from the customer at the laundry station;

providing information directing the customer to place their laundry in a designated or chosen laundry unit container in response to the order received from the customer;

upon completion of the customer placing their laundry in the designated or chosen laundry unit container, generating an electronic message to the customer confirming the details of the order including the designated or chosen laundry unit container in which the order was originally placed;

generating an electronic message to instruct a laundry station operator or a laundry services provider to fulfill the order; and communicating the electronic message and the order to the laundry station operator or the laundry services provider, whereby the laundry station operator or the laundry services provider can obtain the items to be laundered from the designated or chosen laundry unit container to fulfill the order and return the laundered items to the same designated or chosen laundry unit container in which the order was originally placed, further comprising the step of, upon fulfillment of the order for laundry services by the laundry station operator or the laundry services provider, transmitting an electronic message to the customer to notify the customer of the completion of the order and its return to the designated or chosen laundry unit container in which the order was originally placed; and further comprising the step of, upon removal of the laundry by the customer after the fulfillment of the order, generating a second electronic message to notify the laundry station operator that the laundry has been retrieved by the customer.

7. The method of claim 1, further comprising the step of, upon fulfillment of the order for laundry services by the laundry station operator or the laundry services provider, placing a telephone call to the customer to notify the customer of the completion of the order.

8. A method for providing laundry services, comprising the steps of:

receiving and accepting an order for laundry services from a customer, including collecting payment information from the customer;

receiving input from the customer relating to the desired size of one or more laundry unit containers used to receive laundry;

directing the customer to place their laundry in the laundry unit container in response to the input received from the customer;

upon completion of the customer placing their laundry in the laundry unit container, generating an electronic message to the customer confirming the details of the order including the laundry unit container where the order was originally placed;

generating an electronic message to instruct a laundry service provider to fulfill the order;

communicating the electronic message and the order to the laundry services provider, whereby the laundry services provider can obtain the laundry from the laundry unit container to fulfill the order and return the laundry to the same laundry unit container where the order was originally place once the order is fulfilled; and upon fulfillment of the order for laundry services by the laundry station operator or the laundry services provider, transmitting an electronic message to the customer to notify the customer of the completion of the order and its return to the laundry unit container where the order was originally placed.

9. The method of claim 8 wherein the size of the laundry unit container is about 2.5 cubic feet to about 3.5 cubic feet.

10. The method of claim 8, wherein the size of at least one laundry unit container is about 2.5 cubic feet and wherein the size of at least one other laundry unit container is about 3.5 cubic feet.

* * * * *